Sept. 9, 1941.  B. SCHROETER  2,255,088

BEARING FOR INDEPENDENT WHEEL SUSPENSION FOR MOTOR VEHICLES

Filed Oct. 6, 1939  2 Sheets-Sheet 1

INVENTOR.
BRUNO SCHROETER
BY Barnes, Kisselle, Laughlin & Raisch
ATTORNEYS.

Sept. 9, 1941. B. SCHROETER 2,255,088
BEARING FOR INDEPENDENT WHEEL SUSPENSION FOR MOTOR VEHICLES
Filed Oct. 6, 1939 2 Sheets-Sheet 2

INVENTOR.
BRUNO SCHROETER
BY
Barnes, Kisselle, Laughlin & Raisch
ATTORNEYS.

Patented Sept. 9, 1941

2,255,088

UNITED STATES PATENT OFFICE 2,255,088

BEARING FOR INDEPENDENT WHEEL SUSPENSION FOR MOTOR VEHICLES

Bruno Schroeter, Detroit, Mich., assignor to O. & S. Bearing Company, Detroit, Mich., a corporation of Michigan Application October 6, 1939, Serial No. 298,214

15 Claims. (Cl. 267—20)

This invention relates to bearings for independent wheel suspension for motor vehicles and has particularly to do with bearings designed to permit caster and camber adjustment and misalignment correction.

In the mounting of front wheels it has always been a problem to provide for caster and camber adjustments and also adjustments for alignment. Since the adoption of independent wheel suspension or "knee action" for automotive vehicles, there has been considerable problem in providing for these adjustments. Caster adjustment on certain types of suspension has caused a misalignment of bearings which is extremely undesirable since it causes excessive wear. When the caster adjustment exceeds the amount of play in the bearings there is a binding action which causes considerable wear and also decreases the riding quality of the wheel. In connection with camber adjustment there have been numerous attempts to provide for this adjustment and in the past it has usually been done by arranging for the change of the length in one of the connections between the frame and the king pin support.

The present invention contemplates the use of a novel type of bearing which may be readily adjusted to provide for caster or camber correction. With the use of the present device either of these corrections may be made with no binding effect on the bearings and no additional tendency to wear. A further object of the invention has to do with a novel type of bearing connection for permitting caster or camber type of adjustment and for controlling this type of adjustment with extreme accuracy. Another object of the invention has to do with a novel combination of connections on a wheel supporting member which cooperate to permit adjustment of the member. A main feature of the invention resides in the details of construction of these bearings and connection.

Other objects and features of the invention having to do with details of design and operation will be brought out in the following description and claims.

Figure 1:
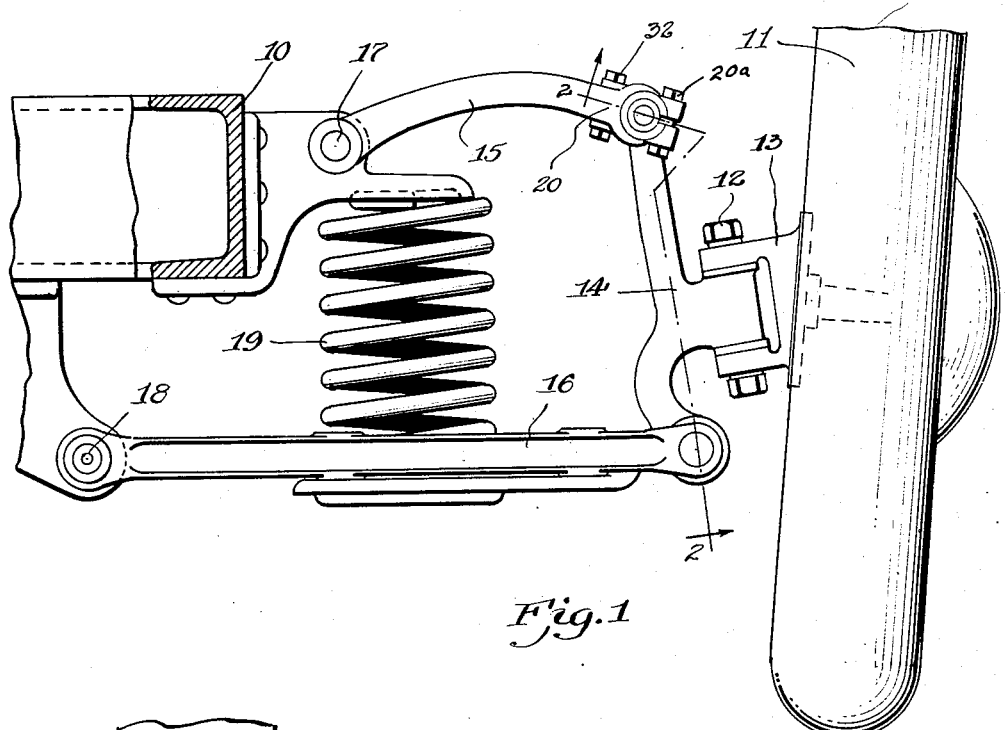
Fig. 1 is a partial front view of an automobile frame illustrating the manner in which a front dirigible wheel is suspended on the frame.

Referring to Fig. 1, the frame of a vehicle is shown at 10 and a front dirigible wheel is shown at 11. A king pin 12 upon which the steering knuckle 13 of the wheel is pivoted, is mounted in a substantially vertical wheel supporting member 14. The wheel supporting member is pivotally connected at the top to a connecting arm 15 leading to the frame and at the bottom to a connecting arm 16. The arms 15 and 16 are pivotally connected at 17 and 18, respectively, to the vehicle frame. A spring 19 suitably mounted serves to afford the necessary resiliency to the wheel suspension. The present invention relates to the bearing connections between the wheel supporting member 14 and the connecting arms 15 and 16. This member 14 is so mounted that it will have two adjustments. As viewed in Fig. 1, if the member 14 is shifted so that its angle with the vertical is altered, the wheel 11 will be moved in a camber adjustment. If the member 14, as viewed in Figs. 2 and 3, is shifted so that its angle with the vertical is changed, this will give a caster adjustment of the wheel 11.

In the embodiment of the invention which is shown for purposes of illustration, the connecting arms 15 and 16 are forked at the ends. Referring to the upper bearing, the arm 15 is split into parallel arms 20 and 21, (Fig. 2). These arms are provided with aligned bearing recesses in which are mounted bushings 22 and 23, respectively. Passing through these bushings is an inner bearing member which consists of a shaft 24. The bushings 22 and 23 are, in this case, of the type in which a compressible expansible material 25 is used and this material surrounds portions 26 and 27 of the shaft 24, which are provided with annular grooves. Any suitable type of bearing may be used for the ends of the shaft 24. A central portion 28 of the shaft 24 between the two portions 26 and 27 is threaded. This central portion 28 forms the inner portion of a connection with the upper end of wheel supporting member 14. The outer portion consists of a compressible expansible material 29 contained as a lining in a split bushing member 30. This bushing member 30 is mounted in a recess in a split ring 31, this recess being located eccentrically in the ring.

The upper end of the member 14 is split and held together by a bolt 32 which when tightened will lock the ring in position and also clamp the bushing 30 and the compressible material 29 on the threaded portion 28. One end of the bearing shaft 24 is slotted at 33 to permit the insertion of the end of a screw driver or other adjusting tool.

Figure 2:
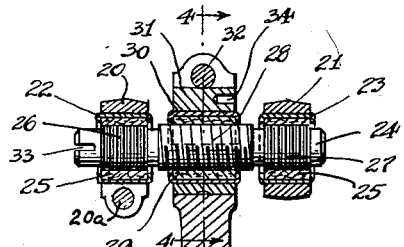
Fig. 2 is a section taken on the lines 2—2 of Fig. 1 illustrating the bearing connections between the wheel supporting member and the frame connecting member.
Figure 3:
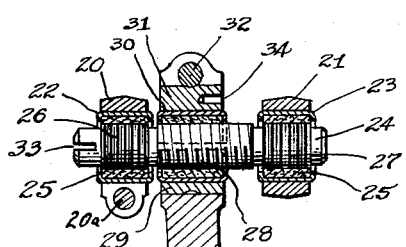
Fig. 3 is a view similar to Fig. 2 showing the parts in adjusted position.
Figure 4:
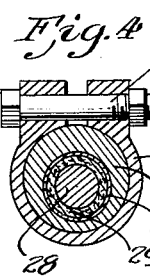
Fig. 4 is a section taken on the lines 4—4 of Fig. 2.

With reference to the lower bearing connection between the arm 16 and the member 14, the arm 16 is forked to provide parallel members 40 and 41 (Fig. 2). Aligned apertures are provided in these forked arms and through these apertures extends a bolt 42 having a threaded end 43 on which is located a lock nut 44. The lower end of the member 14 is provided with a bearing recess in which is mounted a bushing 45 lined with a compressible expansible material 46. The inner bearing member is a tubular member 47 threaded or grooved to provide endwise resistance for the bearing material 46. The tubular member 47 is spherically shaped at each end and these ends are received in spherical sockets 48 formed in the inner walls of forked member 40 and 41. The bolt 42 is provided with a central annular bulge 49 which serves to center the tubular member 47 and permits it to rock longitudinally on the bolt.

If a camber adjustment is to be made on the shaft 14 and the wheel which it supports, the bolt 32 should be loosened and then the ring 31 may be shifted in its recess by the application of tools to apertures such as shown at 34. This will shift the member 14 relative to vertical (see Fig. 1) and permit accurate camber adjustment of the wheel.

If caster adjustment is desired, the bolt 32 should be loosened and a screw driver or other similar tool inserted in the slot 33. A turning of the shaft 24 will cause a shifting of the top of member 14 on the threaded portion 28 of the shaft. In some cases it may be desirable to split the arm 20 and provide a bolt 20a to tighten it on the bushing 22. Then, by loosening bolt 20a, the shaft 24 may be more easily turned. When this adjustment has been made the bolt 32 is again tightened and the member 14 is locked on the shaft 24 through the bushing 30, compressible material 29, and the ring 31. In the meantime, however, there has been a shifting of the angle of the member and this must be compensated for in the bearings. The compensation at the lower bearing is provided for by loosening the nut 44 and bolt 42 prior to the adjustment at the top of the member. This will permit the tubular inner bearing member 47 to rock on the bulge 49 and in the spherical socket 48. Upon completion of the adjustment, a retightening of the bolt and nut will again provide a working bearing at this point. At the top, however, the change in angle between the shaft 24 and the member 14 will be compensated by the shifting of the compressible expansible material 29 to take up this change of angle. As the member 14 is again locked to shaft 24, this shifting and change of angle from 90 degrees will not affect the operation of the bearing. The entire bearing action is still taken by the bushings 22 and 23 and the portions 26 and 27 of shaft 24. A caster adjustment has been shown in Fig. 3 where it will be seen that the top of member 14 has been shifted to the left and the bearing at the lower end of the member has been adjusted to compensate therefor.

Figures 6, 7:
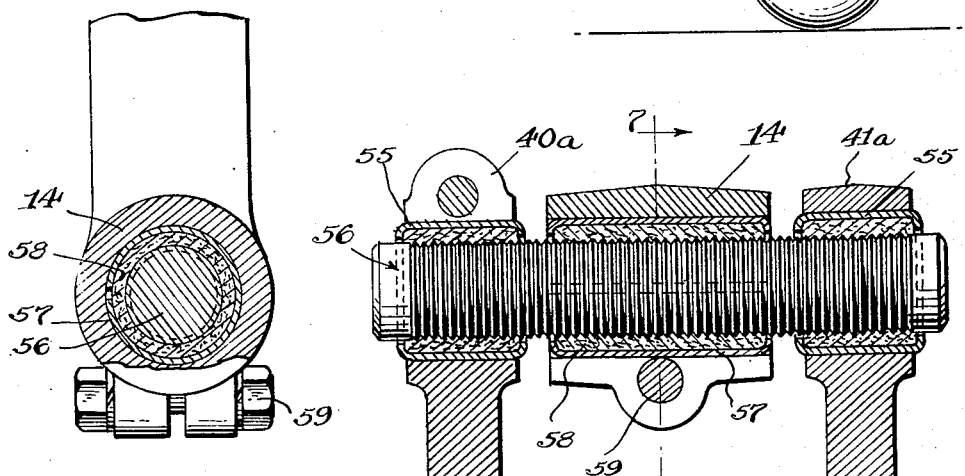
Figs. 5 and 6 are illustrations of modified bearing constructions.
Fig. 7 is a section taken on the lines 7—7 of Fig. 6.

Other types of bearings may be used to provide this adjustment. For example, the lower bearing of the member 14 may be designed as is the top bearing except for the absence of the eccentric ring 31. Such a bearing is shown in Figs. 6 and 7. In this bearing the forked members 40a and 41a each are provided with bushings 55 which cooperate with an inner bearing shaft 56. A lower part of the member 14 is provided with a bushing 57 located in a transverse recess, this bushing having a compressible expansible material 58 as a lining and surrounding the shaft 56. When the caster adjustment is made at the top of this shaft, a bolt 59 which holds the split lower end of the member 14 may be loosened to permit the material 58 to make the adjustment changes necessary. The bolt 59 may then again be tightened to lock the member 14 on the shaft 56. The formation of the shaft 56 contacting the material 58 can be made as annular grooves, threads or a knurled surface, or any other kind of surface which will give the compressible material in the bushing 57 a good grip on the shaft as the clamping bolt 59 is tightened.

Figure 5:
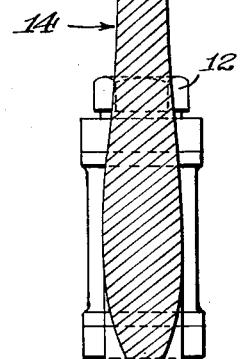
Figure 5:
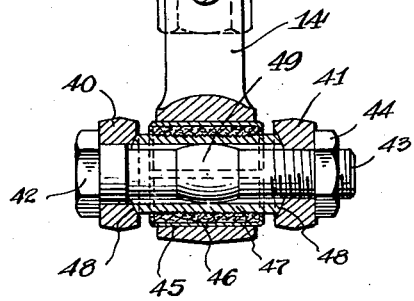
Figure 5:
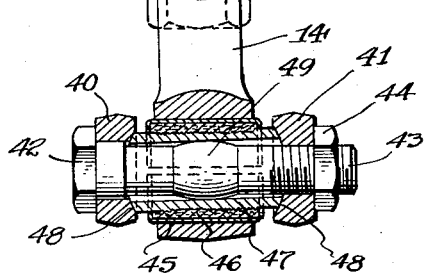
Figure 5:
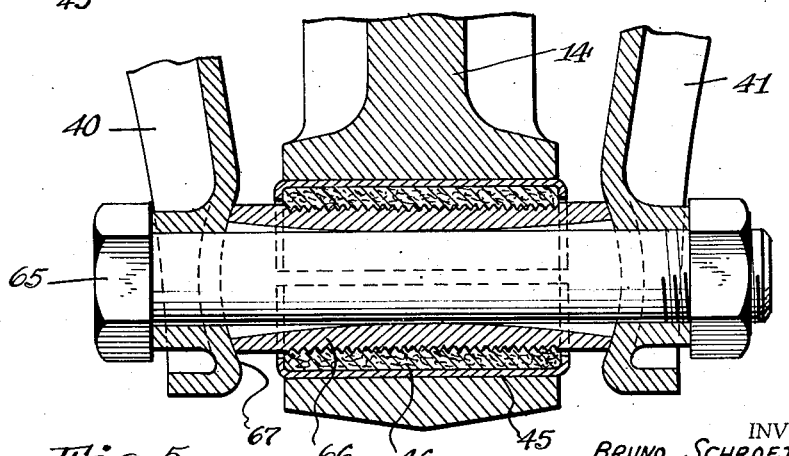

Another modification of the lower bearing is shown in Fig. 5. This modification is similar to the lower bearing shown in Figs. 2 and 3 except that the bolt 65 passing through the bearing has no annular bulge as in the previous modification. Instead the bolt has a cylindrical formation and a tubular member 66, having the usual spherical end surfaces, cooperates with spherical sockets 67 in members 40 and 41. The tubular member 66 is provided with an inner surface which is rounded toward the center-point and tapers toward the ends. With this formation it will be seen that the tubular member is still centered on the bolt 65 but it may rock longitudinally on the bolt as before.

I claim:

1. In a suspension for a dirigible wheel of a vehicle having a frame structure, wheel suspension means including upper and lower connecting arms extending substantially horizontally outward from said frame, a substantially vertical wheel supporting member to be supported between said arms, the outer ends of said arms and the ends of said member each being provided with bearing recesses, and bearing means for connecting said arms and said member comprising a bushing in each of said bearing recesses, the bushing in said member bearing recesses being composed of a compressible material, and a bearing shaft extending through each of the bushings in said member into the bushings of said arms, means arranged to effect axial shifting of said member bushings on said bearing shafts and means for locking said member bushings and said bearing shafts as one piece.

2. In a suspension for a dirigible wheel of a vehicle having a frame structure, wheel suspension means including upper and lower connecting arms extending substantially horizontally outward from said frame, a substantially vertical wheel supporting member to be supported between said arms, a connection between one of said arms and said member comprising a bushing mounted in said one arm and a bushing in one end of said member, a bearing shaft extending through said bushings, compressible means within said member bushing, means arranged to effect axial shifting of said member bushing on said bearing shaft, and means for locking said member bushing and said bearing shaft as one piece, and a bearing connection between the other of said arms and the other end of said member arranged to be adjustable to compensate for axial shifting of said member bushing on said shaft.

3. In a suspension for a dirigible wheel of a vehicle having a frame structure, wheel suspension means including upper and lower connecting arms extending substantially horizontally outward from said frame, a substantially vertical wheel supporting member to be supported between said arms, a connection between one of said arms and said member comprising a bushing mounted in said one arm and a bushing in one end of said member, a bearing shaft extending through said bushings, compressible means within said member bushing, means arranged to effect axial shifting of said member bushing on said bearing shaft, and means for locking said member bushing and said bearing shaft as one piece; and a bearing connection for use in connecting the other of said arms and the other end of said member comprising a bushing in the said other end of said member, a tubular member supported in said bushing having ends shaped to fit a spherical recess, spherical socket surfaces formed in the said other arm for receiving said tubular member, and means for locking said tubular member between said socket surfaces.

4. In a suspension for a dirigible wheel of a vehicle having a frame structure, wheel suspension means including upper and lower connecting arms extending substantially horizontally outward from said frame, a substantially vertical wheel supporting member to be supported between said arms, a connection between one of said arms and said member comprising a bushing mounted in said one arm and a bushing in one end of said member, a bearing shaft extending through said bushings, compressible means within said member bushing, means arranged to effect axial shifting of said member bushing on said bearing shaft, and means for locking said member bushing and said bearing shaft as one piece; and a bearing connection for use in connecting the other of said arms and the other end of said member comprising a bushing in the said other end of said member, a tubular member supported in said bushing having ends shaped to fit a spherical recess, spherical socket surfaces formed in the said other arm for receiving said tubular member, means located in said tubular member forming a rocker member upon which said tubular member may pivot between said socket surfaces, and means for locking said tubular member in a fixed position between said socket surfaces.

5. In a suspension for a dirigible wheel of a vehicle having a frame structure, wheel suspension means including upper and lower connecting arms extending substantially horizontally outward from said frame, a substantially vertical wheel supporting member to be supported between said arms, a connection between one of said arms and said member comprising a bushing mounted in said one arm and a bushing in one end of said member, a bearing shaft extending through said bushings having a threaded portion within said member bushing, compressible means within said member bushing, and means for locking said member bushing and said bearing shaft as one piece; and a bearing connection between the other of said arms and the other end of said member arranged to be adjustable to compensate for axial shifting of said member bushing on said shaft.

6. A suspension device for a vehicle wheel comprising two spaced parallel bearing shafts connected to a vehicle frame, a wheel supporting member to be connected between said shafts, and a bearing connection between one end of said member and one of said shafts comprising a split tubular outer bearing member mounted in said member and surrounding said shaft, a compressible expansible material lining said outer bearing member, means to effect shifting of said outer bearing member on said shaft to change the angle between the axes of said shaft and member, and means for locking said outer bearing member and said compressible material to said shaft.

7. A suspension device for a vehicle wheel comprising two spaced arms connected to a vehicle frame, a wheel supporting member to be connected between said arms, a bearing shaft on one of said arms, and a bearing connection between one end of said member and said shaft arranged to permit change in the angle between said shaft and said member comprising opposed spherical socket members on said arm having the shaft, an outer bearing member mounted in said wheel supporting member and surrounding said shaft, a tubular inner bearing member surrounding said shaft, a formation on said shaft adapted to cooperate with said inner bearing member to center said inner bearing member on said shaft and permit longitudinal rocking on said shaft, and means for locking said inner bearing member in a fixed position relative to said shaft.

8. A suspension device for a vehicle wheel comprising two spaced parallel bearing shafts connected to a vehicle frame, a wheel supporting member to be connected between said shafts, and a bearing connection between one end of said member and one of said shafts arranged to permit change in the angle between said shaft and said member comprising opposed spherical socket members on said shaft, an outer bearing member mounted in said wheel supporting member and surrounding said shaft, a tubular inner bearing member surrounding said shaft, a compressible expansible material compressed between said inner and outer bearing members, a formation on said shaft adapted to cooperate with said inner bearing member to center said inner bearing member on said shaft and permit longitudinal rocking on said shaft, and means for locking said inner bearing member in a fixed position relative to said shaft.

9. A suspension device for a vehicle wheel comprising two spaced parallel bearing shafts connected to a vehicle frame, a wheel supporting member to be connected between said shafts, and a bearing connection between one end of said member and one of said shafts arranged to permit change in the angle between said shaft and said member comprising opposed spherical socket members on said shaft, an outer bearing member mounted in said wheel supporting member and surrounding said shaft, a tubular inner bearing member surrounding said shaft, an annular bulge formation on said shaft adapted to cooperate with the inner surface of said inner bearing member to center said inner bearing member on said shaft and permit longitudinal rocking on said shaft, and means for locking said inner bearing member in a fixed position relative to said shaft.

10. A suspension device for a vehicle wheel comprising two spaced parallel bearing shafts connected to a vehicle frame, a wheel supporting member to be connected between said shafts, and a bearing connection between one end of said member and one of said shafts arranged to permit change in the angle between said shaft and said member comprising opposed spherical socket members on said shaft, an outer bearing member mounted in said wheel supporting member and surrounding said shaft, a tubular inner bearing member surrounding said shaft, an annular convex formation on the inner surface of said inner bearing member adapted to contact said shaft to center said bearing and permit longitudinal rocking on said shaft, and means for locking said inner bearing member in a fixed position relative to said shaft.

11. In a suspension for a dirigible wheel of a vehicle having a frame structure, wheel suspension means including upper and lower connecting arms extending substantially horizontally outward from said frame, a substantially vertical wheel supporting member to be supported between said arms, a connection between one of said arms and said member comprising a bearing shaft mounted in bearings in the one of said arms, and a bearing in said member adapted to cooperate with said shaft comprising a tubular member mounted in a recess in said member, a bearing recess located eccentrically in said tubular member, means for releasably locking said tubular member in said wheel supporting member whereby the bearing recess may be shifted with respect to the axis of said supporting member, and a bearing member in said bearing recess comprising a split outer bearing unit surrounding a threaded portion of said shaft, a compressible expansible material positioned between said unit and said shaft, and means for locking said outer bearing unit and compressible material to said shaft.

12. In a suspension for a dirigible wheel of a vehicle having a frame structure, wheel suspension means including upper and lower connecting arms extending substantially horizontally outward from said frame, a substantially vertical wheel supporting member to be supported between said arms, a connection between one of said arms and said member comprising a bearing shaft mounted in bearings in one of said arms, and a bearing in said member adapted to cooperate with said shaft comprising a tubular member mounted in a recess in said member, a bearing recess located eccentrically in said tubular member, means for releasably locking said tubular member in said wheel supporting member whereby the bearing recess may be shifted with respect to the axis of said supporting member, and split tubular outer bearing member mounted in said bearing recess and surrounding said shaft, a compressible expansible material lining said outer bearing member, means to effect shifting of said outer bearing member on said shaft to change the angle of the axes of said shaft and member, and means for locking said outer bearing member and said compressible material to said shaft.

13. In a suspension for a dirigible wheel of a vehicle having a frame structure, wheel suspension means including upper and lower frame connecting arms, a substantially vertically extending wheel supporting arm adapted to be pivoted at each end to said frame connecting arms, and bearing means arranged to connect said connecting arms and said wheel supporting member comprising a bearing shaft, bearing means connecting said connecting arms and said shaft, said shaft having a threaded portion, a bearing in the extremities of said wheel supporting member surrounding said bearing shaft comprising a soft bearing material enclosed in a split housing and means for tightening said housing and said soft bearing material on the threaded portion of said bearing.

14. In a suspension for a dirigible wheel of a vehicle having a frame structure, wheel suspension means including upper and lower frame connecting arms, a substantially vertically extending wheel supporting arm adapted to be pivoted at each end to said frame connecting arms, and bearing means arranged to connect one of said connecting arms and said wheel supporting member comprising a bearing shaft, bearing means connecting a connecting arm and said shaft, said shaft having a threaded portion, and a bearing connection for use in connecting said connecting arm and said wheel supporting member comprising a cylindrical bearing container held in the end of said connecting member, a bolt passing through said bearing container having an annular bulge at the center portion thereof, an intermediate tubular member surrounding said bolt and lying within said bearing container, said intermediate member having ends shaped to fit a spherical recess, and socket members extending from said connecting arm, each having a spherical recess adapted to cooperate with the shaped ends of said intermediate member, and nut means for locking said members in a definite position.

15. In a suspension for a dirigible wheel of a vehicle having a frame structure, wheel suspension means including upper and lower connecting arms extending substantially horizontally outward from said frame, a wheel supporting member to be supported between said arms, a connecting shaft mounted on one of said arms and having a bearing connection therewith, means connecting said member and said shaft whereby the angular relation therebetween may be changed without strain on the parts, said means being arranged normally to lock said member to said shaft after adjustment, and means connecting the other arm with said member.

BRUNO SCHROETER.